(12) United States Patent
Farrar et al.

(10) Patent No.: US 12,343,906 B2
(45) Date of Patent: Jul. 1, 2025

(54) RESIN-BASED COMPOSITIONS FOR SLUSH MOLDING AND COMPOSITE PARTS MANUFACTURED THEREFROM

(71) Applicant: CpK Interior Products Inc., Port Hope (CA)

(72) Inventors: Gregory James Farrar, Roblin (CA); Murali Mohan Reddy, Belleville (CA)

(73) Assignee: CPK Interior Products Inc., Port Hope (CA)

( * ) Notice: Subject to any disclaimer, the term of this patent is extended or adjusted under 35 U.S.C. 154(b) by 113 days.

(21) Appl. No.: 18/122,303

(22) Filed: Mar. 16, 2023

(65) Prior Publication Data

US 2024/0308116 A1   Sep. 19, 2024

(51) Int. Cl.
*B29C 41/00* (2006.01)
*B29C 41/18* (2006.01)
*B29C 41/22* (2006.01)
*B29C 41/46* (2006.01)
(Continued)

(52) U.S. Cl.
CPC ............ *B29C 41/18* (2013.01); *B29C 41/003* (2013.01); *B29C 41/22* (2013.01); *B29C 41/46* (2013.01);
(Continued)

(58) Field of Classification Search
CPC ....... B29C 41/18; B29C 41/003; B29C 41/22; B29C 41/46; B29C 44/043; B29C 44/0453; B29C 44/06; B29C 44/08; B29C 44/04; B29K 2023/14; B29K 2027/06; B29L 2009/00; B29L 2031/3008; C08L 23/14; C08L 27/06; C08L 53/00; C08L 2203/14
See application file for complete search history.

(56) References Cited

U.S. PATENT DOCUMENTS

| 4,722,678 A | 2/1988 | Wersosky |
| 4,769,278 A | 9/1988 | Kamimura et al. |

(Continued)

FOREIGN PATENT DOCUMENTS

| GB | 1368743 A | 10/1974 |
| GB | 2466432 A | 6/2010 |

(Continued)

OTHER PUBLICATIONS

Extended Search Report mailed May 14, 2024, in corresponding European Patent Office application No. 24163985.5.
(Continued)

*Primary Examiner* — Galen H Hauth
*Assistant Examiner* — Baileigh Kate Darnell
(74) *Attorney, Agent, or Firm* — Harness, Dickey & Pierce PLC

(57) ABSTRACT

A composite part manufactured via a dual cast slush molding technique includes a skin layer having a first side and an opposite second side and a foam layer formed in situ on the second side of the skin layer. The first side of the skin layer defines a Class A surface. The skin layer and the foam layer each comprise a polymer of the same type and are respectively formed from a first resin-based composition and a second resin-based composition. The first resin-based composition and the second resin-based composition each may comprise a polyvinyl chloride (PVC)-based composition or a thermoplastic polyolefin (TPO)-based composition.

30 Claims, 3 Drawing Sheets

(51) Int. Cl.
  *B29C 44/04* (2006.01)
  *C08L 23/14* (2006.01)
  *C08L 27/06* (2006.01)
  *C08L 53/00* (2006.01)
  *B29K 23/00* (2006.01)
  *B29K 27/06* (2006.01)
  *B29L 9/00* (2006.01)
  *B29L 31/30* (2006.01)

(52) U.S. Cl.
  CPC .............. *C08L 23/14* (2013.01); *C08L 27/06* (2013.01); *C08L 53/00* (2013.01); *B29K 2023/14* (2013.01); *B29K 2027/06* (2013.01); *B29L 2009/00* (2013.01); *B29L 2031/3008* (2013.01); *C08L 2203/14* (2013.01)

(56) References Cited

U.S. PATENT DOCUMENTS

| | | |
|---|---|---|
| 5,344,183 A | 9/1994 | Hersman et al. |
| 5,580,501 A | 12/1996 | Gallagher et al. |
| 6,516,736 B1 | 2/2003 | Van Lancker |
| 2003/0109601 A1* | 6/2003 | MacDonald ............ B60R 13/02 264/308 |
| 2015/0322244 A1* | 11/2015 | Iwahori ................. B32B 27/304 524/109 |
| 2017/0240736 A1 | 8/2017 | Farrar |
| 2018/0044536 A1* | 2/2018 | Walia ......................... B01J 2/02 |
| 2018/0215887 A1* | 8/2018 | Kohlstrung ........... B29C 44/188 |
| 2022/0127447 A1 | 4/2022 | Reddy et al. |

FOREIGN PATENT DOCUMENTS

| | | |
|---|---|---|
| WO | WO-02090080 A1 | 11/2002 |
| WO | WO-03033589 A1 | 4/2003 |
| WO | WO-2021239883 A2 | 12/2021 |

OTHER PUBLICATIONS

"OxyVinyls 240F polyvinyl chloride homopolymer data sheet;" 1 page; published Aug. 2017.

* cited by examiner

RESIN-BASED COMPOSITIONS FOR SLUSH MOLDING AND COMPOSITE PARTS MANUFACTURED THEREFROM

BACKGROUND

The present disclosure relates generally to resin-based compositions for manufacturing composite parts via slush-molding.

Soft skins used in automotive interiors, such as for instrument panels, door uppers, consoles, and the like, are oftentimes made using a slush molding process. During slush molding, a powder resin is introduced into a heated mold, which is rotated to distribute the powder resin over a surface of the mold. While the mold is rotating, at least a portion of the powder resin melts and then solidifies to forms a skin layer of solidified resin on the surface of the mold having a desired shape. During the slush molding process, it is important that the powder resin flows smoothly within the mold and uniformly coats the surface of the mold such that a uniform skin layer is formed. Polyvinyl chloride (PVC)-based resins used in slush molding oftentimes have an amorphous microstructure and exhibit good flowability for slush molding. Thermoplastic polyolefin (TPO)-based resins are desirable candidates for use in manufacturing skins for automotive interiors, but the pulverization techniques used to form the TPO-based resins into powders may produce powders having hooks and tails and may exhibit poor flowability for slush molding, which in turn may lead to higher scrap rates and an undesirable appearance.

Skin layers formed via slush molding are usually combined with an underlying foam layer to produce a composite part having a Class A surface and desired haptics, or a desired sense of touch and feel. Such desired haptics include softness, compressibility and flexibility of the Class A surface. The foam layer may be formed by a foam-in-place process in which, after the skin layer is formed, foam is injected and/or foamed between the skin layer and a hard substrate. In some cases, a sheet including a skin layer and a foam layer bonded to one another is cut to a desired size and shape from a calendar roll and then bonded to a rigid substrate, for example, via an adhesive. Such processes are time consuming and oftentimes lead to undesirable amounts of scrap, for example, in some instances, up to 40% of the materials used during the manufacturing process may result in scrap.

The underlying foam layer in automotive interiors is oftentimes made of polyurethane and the skin layer is made of polyvinyl chloride, a thermoplastic polyurethane, or a thermoplastic polyolefin. Thermoplastic polyolefins, however, are nonpolar, have low surface tension, and thus generally lack adhesion to polar materials, such as polyurethane. To ensure good bonding between the TPO skin layer and the polyurethane foam layer, secondary processes such as flame treating or application of adhesives or primer solutions containing polar compounds may be used to increase adhesion, which disadvantageously requires an additional processing step with the associated cost thereof. In addition, when the foam layer is made of polyurethane, instead of PVC or TPO like the skin layer, the resulting composite part and scrap materials are generally not recyclable.

It is therefore desirable to develop a method that can be used to form composite parts including a skin layer and an underlying foam layer bonded thereto that generates less scrap. In addition, it is desirable for the composite parts formed from such method to be recyclable. Furthermore, the composite parts should meet certain stringent criteria, including exceptional color stability and mechanical stability at high temperatures and after prolonged exposure to visible and ultraviolet light.

SUMMARY

A composite part manufactured via a dual cast slush molding technique includes a skin layer having a first side and an opposite second side and a foam layer formed in situ on the second side of the skin layer. The first side of the skin layer defines a Class A surface. The skin layer and the foam layer each comprise a polymer of the same type and are respectively formed from a first resin-based composition and a second resin-based composition of the same type, meaning that the first resin-based composition comprises at least one polymer or at least one polymer having a monomer unit of the same type as that in the second resin-based composition. The skin layer and the foam layer are chemically bonded to each other along an interface therebetween without use of an adhesive. The first resin-based composition and the second resin-based composition each may comprise a polyvinyl chloride (PVC)-based composition or a thermoplastic polyolefin (TPO)-based composition.

In a method of manufacturing the composite part, the first resin-based composition is introduced into a heated mold cavity defined by a mold surface, wherein the first resin-based composition melts and forms a skin layer on the mold surface. Then, the second resin-based composition is introduced into the heated mold cavity and heated such that the second resin-based composition melts and forms a foam layer on the mold surface over the skin layer. During formation of the foam layer, chemical bonds forms between the skin layer and the foam layer that join the skin layer and the foam layer together. Composite parts manufactured by the presently disclosed methods require fewer process steps, generate less scrap material, and can be more readily recycled than composite parts that include a skin layer and a foam layer made from different types of polymers.

Additional features and advantages can be ascertained from the following description and appended claims taken in conjunction with the accompanying drawings.

DETAILED DESCRIPTION

The presently disclosed resin-based compositions are formulated for use in the manufacture of composite parts via slush molding processes that include two stages or two casting steps. In a first step, a first resin-based composition is cast in a mold and heated to form a skin layer on a negative side of the mold. In a second step, a second resin-based composition is cast in the mold over the skin layer and heated to form a foam layer on the negative side of the mold over the skin layer. The first and second resin-based compositions both comprise the same type of base resin such that, during casting of the foam layer, a chemical bond forms between the skin layer and the foam layer that joins the skin layer and the foam layer together. The first and second resin-based compositions can be used to form composite parts including a skin layer and a foam layer that are joined together without use of adhesives or secondary process steps, and without requiring an additional step of bonding the skin layer and the foam layer together after formation thereof. In addition, because the first and second resin-based compositions are both made of the same type of base resin, composite parts manufactured therefrom generate less scrap material and can be more readily recycled than composite parts that include a skin layer and a foam layer made from different types of base resins. In practice, the presently disclosed resin-based compositions may be prepared in the form of powders having a fine, uniform particle size and thus, exhibit good flowability during the slush molding process, which may help ensure the formation of uniform skin and foam layers.

Figure 1:
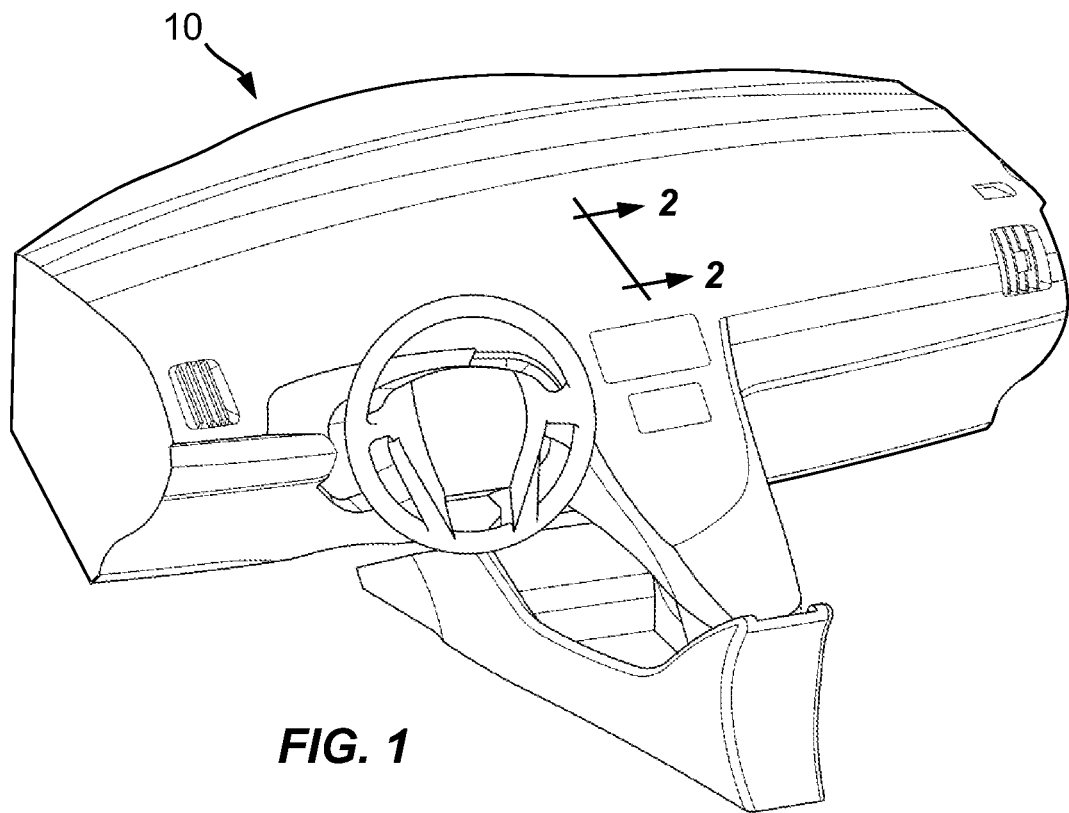
FIG. 1 is a schematic isometric view of an interior panel of an automotive vehicle.
Figure 2:
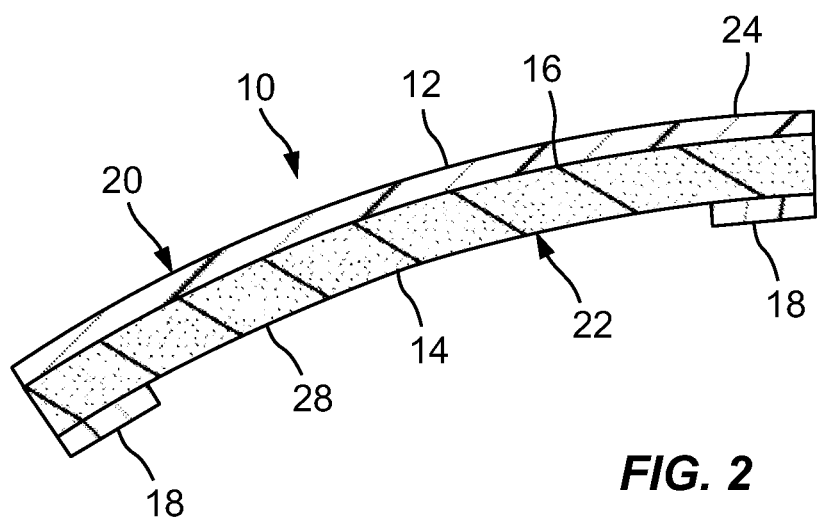
FIG. 2 is a schematic cross-sectional view of the interior panel of FIG. 1, taken along line 2-2, wherein the interior panel comprises a skin layer and a foam layer mounted to a rigid substrate.

FIGS. 1 and 2 depict a composite part 10 that may be formed using a dual cast slush molding process. For example, the composite part 10 may be manufactured using the systems, apparatuses, and/or methods described in commonly owned U.S. patent application Ser. No. 18/094,499 filed Jan. 9, 2023, and titled "Dual Cast Slush Mold System, Methods, and Apparatuses," the entire contents of which are incorporated herein by reference. As shown in FIG. 2, the composite part 10 comprises a skin layer 12 and a foam layer 14 bonded together along an interface 16 between the skin layer 12 and the foam layer 14. In practice, the skin layer 12 and/or the foam layer 14 may be mounted to a rigid substrate 18.

The composite part 10 depicted in FIG. 1 is in the form of an interior panel, specifically, an instrument panel and/or center floor-mounted console for an automotive vehicle; however, the present disclosure is not limited thereto. For example, the presently disclosed resin-based compositions may be used in slush molding processes to manufacture composite parts exhibiting any desired shape. Examples of composite parts that may be manufactured using the presently disclosed resin-based compositions include interior components of automotive vehicles, for example, A-pillars, B-pillars, C-pillars, steering wheel skins, airbag covers, seamless airbag doors, door trim panels, door handles, pillar handles, roof handles, knee bolsters, seat mechanism covers, sun visors, and the like. In addition, the presently disclosed resin-based compositions may be used in slush molding processes to manufacture composite parts for other industries, including furniture, bus and train seats, toys, shoes, household goods, and components therefor.

Referring again to FIG. 2, the skin layer 12 has a first side 20 and an opposite second side 22. The first side 20 of the skin layer 12 defines an exterior surface 24 of the composite part 10. In aspects, the exterior surface 24 defined by the first side 20 of the skin layer 12 is a Class A surface. The skin layer 12 may have a thickness of greater than or equal to about 0.5 millimeters (mm) to less than or equal to about 3 mm or about 1 mm. In one configuration, the skin layer 12 has a thickness of about 0.6 mm. The skin layer 12 is preferably nonporous. In aspects where the skin layer 12 is made of a PVC-based composition, the skin layer 12 preferably has a density of greater than or equal to about 1.15 grams per cubic centimeter ($g/cm^3$) to less than or equal to about 1.2 $g/cm^3$. In one configuration, the skin layer 12 is made of a PVC-based composition and has a density of about 1.15 $g/cm^3$. In aspects where the skin layer 12 is made of a TPO-based composition, the skin layer 12 preferably has a density of greater than or equal to about 0.8 $g/cm^3$, or optionally about 0.89 $g/cm^3$, to less than or equal to about 0.92 $g/cm^3$. In one configuration, the skin layer 12 is made of a TPO-based composition and has a density of about 0.892 $g/cm^3$.

The foam layer 14 is formed on the second side 22 of the skin layer 12 and defines an inner surface 28 of the composite part 10. The foam layer 14 may have a thickness of greater than or equal to about 2 mm, or optionally about 2.5 mm to less than or equal to about 5 mm, or optionally about 3 mm. In one embodiment, the foam layer 14 has a thickness of about 3 mm. The foam layer 14 is porous with a density less than that of the skin layer 12. For example, the foam layer 14 may have a density of greater than or equal to about 0.17 $g/cm^3$ to less than or equal to about 0.5 $g/cm^3$. In one configuration, the foam layer 14 has a density of about 0.2 $g/cm^3$.

It is noteworthy that during formation of the foam layer 14 on the second side 22 of the skin layer 12, chemical bonds form between the skin layer 12 and the foam layer 14. The strength of the bond formed between the skin layer 12 and the foam layer 14 during manufacture thereof may be greater than or equal about 30 Newtons per centimeter (N/cm), optionally greater than or equal to about 40 N/cm, or optionally about 45 N/cm, as measured by 90° peel testing on a tensile compression testing machine. The strength of the adhesive bond formed along the interface 16 between the skin layer 12 and the foam layer 14 is preferably at least as strong as the cohesive bonds respectively formed within the skin layer 12 and the foam layer 14. As such, when the composite part 10 is subjected to adhesion testing, cohesive failure may occur within the skin layer 12 or the foam layer 14 itself and adhesive failure may not occur along the interface 16 between the skin layer 12 and the foam layer 14.

The skin layer 12 and the foam layer 14 may be respectively formed from a first resin-based composition and a second resin-based composition. And the skin layer 12 may have substantially the same composition as that of the first resin-based composition and the foam layer 14 may have substantially the same composition as that of the second resin-based composition. The first and second resin-based compositions each may comprise a base resin and a stabilizer mixture. In addition to the base resin and the stabilizer mixture, the first resin-based composition used to form the skin layer 12 may comprise an inorganic filler. In addition to the base resin and the stabilizer mixture, the second resin-based composition used to form the foam layer 14 preferably comprises a foaming agent and an activator. The amounts of each component in the first and second resin-based compositions may in some instances be calculated based on and/or described with reference to the amount of the base resin in the compositions. For example, each component may be present in the first and second resin-based compositions in an amount per one hundred (100) parts resin (phr), wherein the 100 parts resin refers to 100 parts, by weight, of the base resin.

The base resin of the first resin-based composition and of the second resin-based composition may comprise a thermoplastic polymer or a mixture of thermoplastic polymers. In any case, the base resins of the first and second resin-based compositions preferably are of the "same type," meaning that the base resins of the first and second resin-based compositions preferably comprise at least one polymer of the same type or at least one polymer having a monomer unit of the same type. One type of polymer is polyvinyl chloride (PVC). Other types of polymers are polypropylene and polyethylene. One type of monomer unit is vinyl chloride. Other types of monomer units are propylene, ethylene, 1-octene, styrene, and vinyl acetate. In some embodiments, the base resins of the first and second resin-based compositions each may comprise polyvinyl chloride and/or a copolymer including a vinyl chloride monomer unit (a PVC copolymer). One example of a PVC copolymer is polyvinyl chloride acetate (PVCA), which is a copolymer of vinyl chloride and vinyl acetate monomer units. In some aspects, the base resins of the first and second resin-based compositions each may comprise polypropylene and/or a copolymer including a propylene monomer unit (a propylene copolymer). In some aspects, the base resins of the first and second resin-based compositions each may comprise polyethylene and/or a copolymer including an ethylene monomer unit (an ethylene copolymer). One example of an ethylene copolymer is ethylene-1-octene. When the base resin of the first and/or second resin-based composition comprises a copolymer, the copolymer may be a linear copolymer with alternating copolymers, statistical copolymers, or block copolymers or a branched copolymer.

The composite part 10 is formed via a slush molding process that includes multiple stages or steps, and more desirably includes two stages or two casting steps. In a first step, the first resin-based composition is introduced into or cast in a heated mold cavity defined by a mold surface. The mold surface of the mold cavity is a negative of the exterior surface 24 of the composite part 10 being formed. When the first resin-based composition is introduced into the heated mold cavity, the first resin-based composition melts and forms the skin layer 12 on the mold surface of the mold cavity. In a second step, the second resin-based composition is introduced into or cast in the heated mold cavity, wherein the second resin-based composition melts and forms the foam layer 14 on the mold surface of the mold cavity over the skin layer 12. During formation of the foam layer 14, chemical bonds form between the skin layer 12 and the foam layer 14 that join the skin layer 12 and the foam layer 14 together. The mold may be heated to a temperature of greater than or equal to about 235 degrees Celsius (° C.) to less than or equal to about 240° C. during formation of the skin layer 12. During formation of the foam layer 14, the mold may be heated to a temperature of greater than or equal to about 185° C. to less than or equal to about 210° C. The skin layer 12 and the foam layer 14 may be cooled in the mold cavity a temperature less than or equal to about 50° C. to form the composite part 10 prior to removing the composite part 10 from the mold cavity.

PVC-Based Composition

In a first embodiment, the first and second resin-based compositions each comprise a PVC-based composition. In such case, the first resin-based composition is referred to as a first PVC-based composition and the second resin-based composition may be referred to as a second PVC-based composition. The first and second PVC-based compositions used to respectively form the skin layer 12 and the foam layer 14 each may comprise a base resin, a plasticizer, a stabilizer mixture, an absorbent powder, and optionally a pigment. In addition, the first PVC-based composition used to form the skin layer 12 may comprise an inorganic filler and the second PVC-based composition used to form the foam layer 14 may comprise a foaming agent and an activator.

The base resin comprises particles of a PVC homopolymer or a copolymer including a vinyl chloride monomer unit. In an exemplary embodiment, the base resin comprises particles of a suspension grade PVC homopolymer, meaning that the PVC homopolymer is made by polymerizing droplets of vinyl chloride monomer suspended in water, which results in the formation of highly porous particles having a mean particle diameter of greater than or equal to about 20 micrometers to less than or equal to about 250 micrometers and a porosity of greater than or equal to about 0.31 and less than or equal to about 0.38. In aspects, the suspension grade PVC homopolymer particles may have a mean particle diameter of about 50 micrometers. The highly porous nature of the suspension grade PVC homopolymer particles enables the particles to absorb large amounts of plasticizer during manufacture of first and second PVC-based compositions. The PVC homopolymer may have an inherent viscosity of greater than or equal to about 1 deciliters per gram (dL/g) to less than or equal to about 1.04 dL/g and a K-value of greater than or equal to about 68 to less than or equal to about 70. The PVC-based composition may comprise about 100 phr of the one or more PVC homopolymers. One example of a commercially available PVC homopolymer is OxyVinyls® 240F supplied by Oxy Vinyls, LP of Dallas, Texas. In aspects, the base resin of the PVC-based composition may constitute, by weight, greater than or equal to about 40%, optionally about 45%, or optionally about 50% to less than or equal to about 70%, optionally about 60%, or optionally about 55% of the PVC-based composition.

The plasticizer may be included in the PVC-based composition to provide the PVC-based composition as well as the skin layer 12 and the foam layer 14 of the composite part 10 with certain desirable characteristics. For example, the plasticizer may help control and/or adjust the thixotropic properties of the PVC-based composition. As another example, the plasticizer may impart certain desirable haptics to the composite part 10, including hardness or softness. The plasticizer may comprise a primary plasticizer and a secondary plasticizer.

The primary plasticizer may comprise a monomeric ester or a polymeric ester. Examples of primary plasticizers include adipates; $C_8$-, $C_9$-, $C_{10}$-, and/or $C_{11}$-phthalates; $C_8$-, $C_9$-, and/or $C_{10}$-trimellitates; polymerics (e.g., polyphthalates, polyadipates, and/or polytrimellitics); and combinations thereof. In aspects, the primary plasticizer may comprise a branched trimellitate ester with isononanol ($C_9$) termination (a triisononyl trimellitate, TINTM, CAS No. 53894-23-8). One example of a commercially available triisononyl trimellitate is Synplast TINTM Electrical from Geon Performance Solutions. The PVC-based composition may comprise greater than or equal to about 30 phr, or optionally about 45 phr, to less than or equal to about 90 phr of the primary plasticizer. In aspects, the primary plasticizer may constitute, by weight, greater than or equal to about 20% to less than or equal to about 60% of the PVC-based composition.

The first PVC-based composition used to manufacture the skin layer 12 may comprise greater than or equal to about 60 phr to less than or equal to about 90 phr of the primary plasticizer. For example, in some aspects, the first PVC-based composition may comprise about 75 phr of the primary plasticizer. The primary plasticizer may comprise, by weight, greater than or equal to about 30% to less than or equal to about 45% of the first PVC-based composition. For example, in aspects, the primary plasticizer may comprise, by weight, about 37% of the first PVC-based composition. The second PVC-based composition used to manufacture the foam layer 14 may comprise greater than or equal to about 50 phr to less than or equal to about 70 phr of the primary plasticizer. The primary plasticizer may comprise, by weight, greater than or equal to about 24% to less than or equal to about 35% of the second PVC-based composition.

The secondary plasticizer may comprise an oil-based material, e.g., a vegetable oil, petroleum oil, or a combination thereof. In aspects, the secondary plasticizer may comprise epoxidized soybean oil, CAS No. 8013-07-8. One example of a commercially available epoxidized soybean oil is Plas-Chek® 775 from Valtris Specialty Chemicals. The PVC-based composition may comprise greater than or equal to about 1 phr to less than or equal to about 20 phr of the secondary plasticizer. In aspects, the PVC-based composition may comprise about 10 phr of the secondary plasticizer. In aspects, the secondary plasticizer may constitute, by weight, greater than or equal to about 0.5% to less than or equal to about 10% of the PVC-based composition.

The first PVC-based composition used to manufacture the skin layer 12 may comprise greater than or equal to about 5 phr to less than or equal to about 15 phr of the secondary plasticizer. For example, in aspects, the first PVC-based composition may comprise about 10 phr of the secondary plasticizer. The secondary plasticizer may comprise, by weight, greater than or equal to about 2% to less than or equal to about 10% of the first PVC-based composition. For example, in aspects, the secondary plasticizer may comprise, by weight, about 5% of the first PVC-based composition. The second PVC-based composition used to manufacture the foam layer 14 may comprise greater than or equal to about 1 phr to less than or equal to about 10 phr of the secondary plasticizer. The secondary plasticizer may comprise, by weight, greater than or equal to about 0.5% to less than or equal to about 5% of the second PVC-based composition.

The stabilizer mixture may comprise a mixture of materials and may be formulated to help provide the composite part 10 with good thermal stability and/or color retention. The stabilizer mixture may be formulated to help maintain the physical integrity of the composite part 10 and thereby help extend the usable life of the composite part 10. In the second PVC-based composition used to manufacture the foam layer 14, the heat stabilizer may help lower the activation energy of the foaming agent, thereby helping catalyze the generation of gas bubbles at relatively low temperatures. The stabilizer may comprise at least one of a heat stabilizer, an ultraviolet (UV) absorber, and a hindered amine light stabilizer (HALS).

The heat stabilizer may comprise a zinc-containing compound (e.g., zinc oxide), a barium-containing compound (e.g., a barium salt), optionally a solvent, optionally an antioxidant, and optionally an organophosphorus compound. The zinc-containing compound may constitute, by weight, about 5% to 10% of the heat stabilizer and the barium-containing compound may constitute, by weight, about 20% to 30% of the heat stabilizer. One example of a commercially available heat stabilizer is Therm-Chek® RC79L from Valtris Specialty Chemicals. The PVC-based composition may comprise greater than or equal to about 1 phr or optionally about 2 phr to less than or equal to about 10 phr, or optionally about 6 phr, of the heat stabilizer. In some formulations, the PVC-based composition may comprise about 4 phr of the heat stabilizer. The heat stabilizer may constitute, by weight, greater than or equal to about 0.5% or optionally about 1% to less than or equal to about 5% or optionally about 3% of the PVC-based composition. In aspects, the heat stabilizer may constitute, by weight, about 2% of the PVC-based composition.

The UV absorber may be formulated to help absorb ultraviolet radiation applied to the composite part 10 to help prevent or inhibit degradation of the physical appearance and/or mechanical properties of the composite part 10. The UV absorber may comprise a benzotriazole, a benzophenone, benzoate, or a combination thereof. In aspects, the UV absorber comprises a benzotriazole. One example of a commercially available UV absorber is BLS® 1130 from Mayzo, Inc. of Suwanee, GA. The PVC-based composition may comprise greater than or equal to about 0.1 phr, or optionally about 0.2 phr to less than or equal to about 2 phr, or optionally about 1 phr, of the UV absorber. In aspects, the PVC-based composition may comprise about 0.4 phr of the UV absorber. The UV absorber may constitute, by weight, greater than or equal to about 0.05%, or optionally about 0.1% to less than or equal to about 1%, or optionally about 0.5%, of the PVC-based composition. In an embodiment, the UV absorber may constitute, by weight, about 0.25% of the PVC-based composition.

The HALS may be formulated to help inhibit degradation of the composite part 10, for example, by removing free radicals resulting from photooxidation thereof. The HALS does not absorb visible light or UV radiation. The HALS may comprise a piperidine, an amide, or a combination thereof. In aspects, the HALS may comprise a piperidine. One example of a commercially available HALS is BLS® 292 from Mayzo, Inc. of Suwanee, GA. The PVC-based composition may comprise greater than or equal to about 0.1 phr, or optionally about 0.2 phr to less than or equal to about 2 phr, or optionally about 1 phr, of the HALS. In some configurations, the PVC-based composition may comprise about 0.4 phr of the HALS. The HALS may constitute, by weight, greater than or equal to about 0.05%, or optionally about 0.1% to less than or equal to about 1%, or optionally about 0.5%, of the PVC-based composition. In aspects, the HALS may constitute, by weight, about 0.25% of the PVC-based composition.

The absorbent powder may be formulated to help absorb residual amounts of the plasticizer and/or the stabilizer mixture during processing of the PVC-based composition. In the second PVC-based composition used to manufacture the foam layer 14, the absorbent powder acts as a nucleating agent and assists in the generation of gas bubbles within the foam layer 14. The absorbent powder may comprise particles of a PVC homopolymer. In aspects, the absorbent powder preferably comprises a dispersion grade PVC homopolymer, meaning that the PVC homopolymer is manufacturer via micro-suspension polymerization of vinyl chloride monomer. The dispersion grade PVC homopolymer particles may have a mean particle diameter of greater than or equal to about 1 micrometer to less than or equal to about 50 micrometers. The dispersion grade PVC homopolymer may have an inherent viscosity of greater than or equal to about 0.8 dL/g to less than or equal to about 0.9 dL/g (ASTM D1243-60-A: 0.2% concentration in cyclohexanone at 30° C.) and a K-value of greater than or equal to about 63 to less than or equal to about 64. One example of a commercially available absorbent powder is Geon® 124A from Geon Performance Solutions. The PVC-based composition may comprise greater than or equal to about 5 phr to less than or equal to about 15 phr of the absorbent powder. In aspects, the PVC-based composition may comprise about 9 phr of the absorbent powder. The absorbent powder may constitute, by weight, greater than or equal to about 2.5% to less than or equal to about 7.5% of the PVC-based composition. In aspects, the absorbent powder may constitute, by weight, about 4.5% of the PVC-based composition.

The inorganic filler is included in the first PVC-based composition used to form the skin layer 12 and is formulated to help control and/or adjust the rheology and/or viscosity of the first PVC-based composition. The inorganic filler may be included in the first PVC-based composition to help control and/or adjust the density of the skin layer 12. The inorganic filler may comprise calcium carbonate, $CaCO_3$. The first PVC-based composition may comprise greater than or equal to about 0.5 phr to less than or equal to about 2 phr of the inorganic filler. The inorganic filler may constitute, by weight, greater than or equal to about 0.25% to less than or equal to about 1% of the first PVC-based composition.

The foaming agent is included in the second PVC-based composition used to form the foam layer 14 and is formulated to thermally decompose when heated during the slush molding process to generate fine gas bubbles within the second PVC-based composition, which provide the foam layer 14 with porosity. When heated, the foaming agent may be formulated to thermally decompose and release gases of nitrogen ($N_2$), carbon monoxide (CO), carbon dioxide ($CO_2$), or combinations thereof. The foaming agent may comprise an endothermic or an exothermic chemical foaming agent. The foaming agent may comprise an azodicarbonamide. One example of a commercially available endothermic chemical foaming agent is 6836 iD Endo Powder 130 MFC Chemical Foaming Agent (CFA) supplied by iD Additives of LaGrange, IL. One example of a commercially available exothermic chemical foaming agent is 71340 iD MFC Exothermic CFA Powder supplied by iD Additives of LaGrange, IL. The second PVC-based composition may comprise greater than or equal to about 1 phr, or optionally about 5 phr to less than or equal to about 22 phr, or optionally about 10 phr, of the foaming agent. In aspects, the second PVC-based composition may comprise about 6 phr of the foaming agent. The foaming agent may constitute, by weight, greater than or equal to about 0.5%, or optionally about 2.5% to less than or equal to about 12.5%, or optionally about 6%, of the second PVC-based composition. In some configurations, the foaming agent may constitute, by weight, about 3.3% of the second PVC-based composition.

The activator is included in the second PVC-based composition used to form the foam layer 14 and is formulated to help lower the activation energy of the foaming agent so that gas generation can be achieved within the second PVC-based composition at sufficiently low temperatures to avoid overheating and/or charring of the skin layer 12 and/or the foam layer 14. For example, the activator may lower the activation energy of the foaming agent such that the foaming agent thermally decomposes and gas generation occurs within the second PVC-based composition at temperatures greater than or equal to about 150° C., or optionally about 163° C., and less than about 180° C., or optionally less than or equal to about 165° C. Without the activator, thermal decomposition of the foaming agent would generally not occur until the foaming agent is heated to a temperature of greater than or equal to about 180° C., or optionally about 220° C. The activator may comprise a zinc-containing compound. The second PVC-based composition may comprise greater than or equal to about 0.1 phr to less than or equal to about 0.5 phr of the activator. In aspects, the second PVC-based composition may comprise about 0.25 phr of the activator. The activator may constitute, by weight, greater than or equal to about 0.06% to less than or equal to about 0.3% of the second PVC-based composition. In aspects, the activator may constitute, by weight, about 0.14% of the second PVC-based composition.

The optional pigment may be formulated to impart a desired color to the skin layer 12 and/or the foam layer 14. The pigment may comprise carbon black, a metal oxide (e.g., titanium dioxide), or a combination thereof. The PVC-based composition may comprise greater than or equal to about 0.5 phr to less than or equal to about 2 phr of the pigment. In aspects, the PVC-based composition may comprise about 1.2 phr of the pigment. The pigment may constitute, by weight, greater than or equal to about 0.2% to less than or equal to about 1.5% of the PVC-based composition. In aspects, the pigment may constitute, by weight, about 0.67% of the PVC-based composition.

Figure 3:
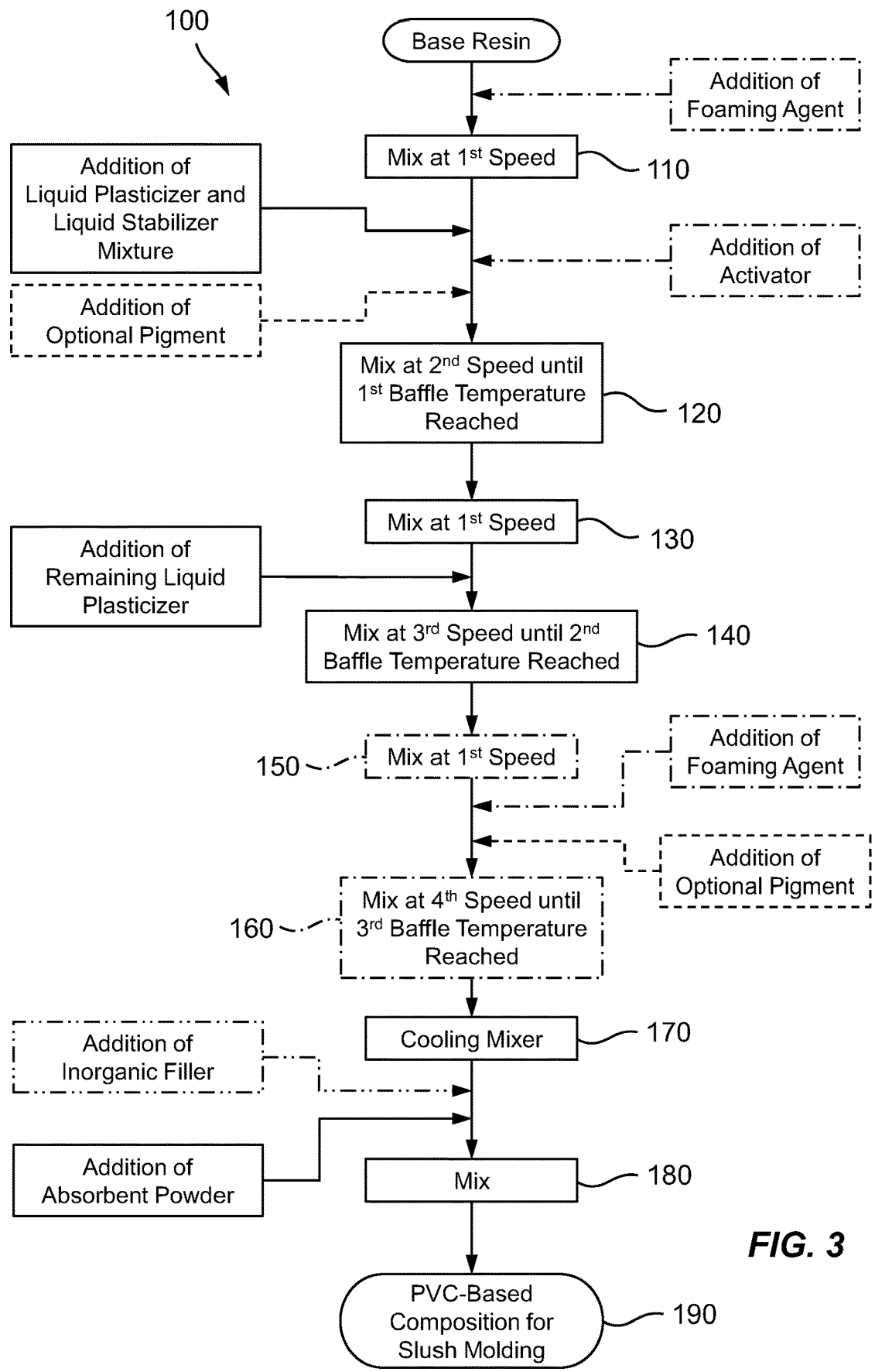
FIG. 3 is a process flow diagram of a method of manufacturing a PVC-based composition for a slush molding process.

Referring now to FIG. 3, the PVC-based composition is manufactured by a method 100 that includes one or more of the following steps. In a first step 110, the base resin is introduced into a mixer, which may be a Henschel-type mixer, and mixed or blended at a $1^{st}$ speed of greater than or equal to about 350 revolutions per minute (rpm) to less than or equal to about 450 rpm. For example, in one embodiment, the base resin is mixed or blended in the mixer at a $1^{st}$ speed of about 400 rpm. The base resin is preferably in the form of a powder when introduced into the mixer. When the method 100 is used to manufacture the second PVC-based composition, the foaming agent optionally may be introduced into the mixer along with the base resin in step 110.

In a second step 120, at least a portion of the plasticizer and the stabilizer mixture are introduced into the mixer and mixed at a $2^{nd}$ speed of greater than or equal to about 500 rpm to less than or equal to about 600 rpm until a $1^{st}$ baffle temperature of greater than or equal to about 90° C. to less than or equal to about 130° C. is reached. For example, in one embodiment, the portion of the plasticizer and the stabilizer mixture are introduced into the mixer and mixed at a $2^{nd}$ speed of about 550 rpm until a $1^{st}$ baffle temperature of about 110° C. is reached. The plasticizer and the stabilizer mixture are preferably in liquid form when introduced into the mixer. The plasticizer and the stabilizer mixture may be uniformly mixed together prior to being introduced into the mixer. In some aspects, in step 120, a portion of the primary plasticizer and all of the secondary plasticizer may be introduced into the mixer. For example, by weight, greater than or equal to about 50% to less than or equal to about 100%, or optionally about 55%, of the primary plasticizer may be introduced into the mixer in step 120. In other aspects, the optional pigment may be introduced into the mixer along with the portion of the plasticizer and the stabilizer mixture in step 120. When the method 100 is used to manufacture the second PVC-based composition, the activator optionally may be introduced into the mixer along with the portion of the plasticizer, the stabilizer mixture, and the optional pigment in step 120.

After the $1^{st}$ baffle temperature is reached, in step 130, the speed of the mixer may be returned to the $1^{st}$ speed.

In step 140, the remaining portion of the primary plasticizer may be introduced into the mixer and mixed at a $3^{rd}$ speed of greater than or equal to about 450 rpm to less than or equal to about 550 rpm until a $2^{nd}$ baffle temperature of greater than or equal to about 115° C. to less than or equal to about 155° C. is reached and a bowl temperature of greater than or equal to about 105° C. to less than or equal to about 145° C. is reached. For example, in one embodiment, the remaining portion of the primary plasticizer is introduced into the mixer and mixed at a $3^{rd}$ speed of about 500 rpm until a $2^{nd}$ baffle temperature of about 134° C. is reached and a bowl temperature of about 126° C. is reached.

When the method 100 is used to manufacture the second PVC-based composition, instead of introducing the foaming agent into the mixer in step 110, the foaming agent alternatively may be introduced into the mixer after step 140. In such case, the method optionally may include additional steps 150 and 160. When the method includes additional steps 150 and 160, prior to step 150, the mixer may be mixed in step 140 at the $3^{rd}$ speed until the $2^{nd}$ baffle temperature is reached.

In optional step 150, after the $2^{nd}$ baffle temperature is reached in step 140, the speed of the mixer may be returned to the $1^{st}$ speed. Then, in optional step 160, the foaming agent may be introduced into the mixer and mixed at a $4^{th}$ speed of greater than or equal to about 450 rpm to less than or equal to about 550 rpm until a $3^{rd}$ baffle temperature of greater than or equal to about 115° C. to less than or equal to about 155° C. is reached and a bowl temperature of greater than or equal to about 105° C. to less than or equal to about 145° C. is reached. For example, in optional step 160, the foaming agent may be introduced into the mixer and mixed at a $4^{th}$ speed of about 500 rpm until a $3^{rd}$ baffle temperature of about 134° C. is reached and a bowl temperature of about 126° C. is reached. In aspects where the PVC-based composition comprises greater than about 60 phr of the plasticizer, it may be beneficial to introduce the foaming agent into the mixer in step 160 (instead of step 110) to ensure good absorption of the plasticizer in the pores of the base resin. It may be beneficial, in this situation, to introduce the foaming agent into the mixer in step 160 after a temperature of greater than or equal to about 80° C. is reached within the mixer. In some configurations, instead of introducing the optional pigment into the mixer in step 120, the optional pigment may be introduced into the mixer along with the foaming agent in step 160.

After the target baffle temperature and the target bowl temperature are reached in step 140 or step 160, the mixture of the base resin, the plasticizer, the stabilizer mixture, optionally the foaming agent, optionally the activator, and the optional pigment may be discharged to a cooling mixer in step 170.

In step 180, after the mixture has cooled to a temperature of about 50° C., the absorbent powder may be introduced into the cooling mixer and the mixture may be mixed for about 5 minutes to form the PVC-based composition in step 190.

When the method 100 is used to manufacture the first PVC-based composition, in step 180, after the mixture has cooled to a temperature of about 55° C., the inorganic filler may be introduced into the cooling mixer and mixed for about 5 minutes to form the first PVC-based composition in step 190.

In embodiments, a method of manufacturing a polyvinyl chloride (PVC)-based composition for slush molding comprises steps (a)-(g). In step (a), a base resin comprising a PVC homopolymer is introduced into mixer operating at a $1^{st}$ mixing speed of about 400 rpm. In step (b), liquid additives are introduced into the mixer. The liquid additives comprise a first portion of a primary plasticizer, a secondary plasticizer, and a stabilizer mixture. In step (c), the mixer is operated at a $2^{nd}$ mixing speed of about 550 rpm until a $1^{st}$ baffle temperature of about 110° C. is reached. In step (d), a remaining portion of the primary plasticizer is introduced into the mixer while the mixer is operating at the $1^{st}$ Mixing Speed to form a mixture. In step (e), the mixer is operated at a $3^{rd}$ Mixing Speed of about 500 rpm until a $2^{nd}$ Baffle Temperature of about 126° C. is reached and a Bowl Temperature of about 134° C. is reached. In step (f), the mixture is introduced into a cooling mixer. And, in step (g), an absorbent powder is introduced into the cooling mixer to form the PVC-based composition. In some embodiments, the absorbent powder is introduced into the cooling mixer in step (g) at a temperature of about 50° C. and mixed in the cooling mixer for about 5 minutes. In some embodiments, the PVC-based composition formed in step (g) may be formulated to produce a foam layer when heated in a mold cavity during a slush molding process. In such case, in step (b), a liquid activator is introduced into the mixer along with the liquid additives. In some aspects, in step (a), a foaming agent is introduced into the mixer along with the base resin. In other aspects, after step (d) and prior to step (e), the mixer is operated at the $3^{rd}$ Mixing Speed of about 500 rpm until the $1^{st}$ Baffle Temperature of about 110° C. is reached, a foaming agent is introduced into the mixer at the $1^{st}$ Mixing Speed of about 400 rpm, and then step (e) is performed. In other embodiments, the PVC-based composition formed in step (g) is formulated to produce a skin layer when heated in a mold during a slush molding process. In such case, in some aspects, in step (g), an inorganic filler is introduced the cooling mixer at a temperature of about 55° C. and mixing for about 5 minutes to form the PVC-based composition.

When the skin layer 12 and the foam layer 14 are respectively formed from the first PVC-based composition and the second PVC-based composition using a slush molding process, the skin layer 12 and the foam layer 14 may exhibit certain desirable properties. For example, the skin layer 12 may have a hardness of about 69±0.5 as measured by ASTM D2240, a tensile strength at maximum load of about 1420 MPa±26 MPa, as measured by ASTM D412, an elongation at break of about 398%±16%, as measured by ASTM D412, a tear strength of about 206 kN/m±11 KN/m, as measured by ASTM D624, and a fog number of about 75 at 95° C. and a fog number of about 68 at 110° C., as measured by SAE J1756. When subjected to cold flexibility testing, wherein a 50-millimeter×150-millimeter sample of the skin layer 12 is bent 180° over a 20-millimeter diameter mandrel at a temperature of about −40° C., the sample of the skin layer 12 does not exhibit cracks. After heat aging, wherein samples of the skin layer 12 are heated at a temperature of about 110° C. for about 1000 hours, the tensile strength of the skin layer 12 was only reduced by about 3%, as measured by ASTM D573 and ASTM D412, and the elongation at break of the skin layer 12 was only reduced by about 18%, as measured by ASTM D573 and ASTM D412. When subjected to EMMAQUA exposure testing in New River, Arizona, pigmented samples of the skin layer 12 and the foam layer 14 (black, grey, and beige) had a ΔE of less than 1.

TPO-Based Composition

In another embodiment, the first and second resin-based compositions each comprise a thermoplastic polyolefin (TPO)-based composition. In such case, the first resin-based composition is referred to as a first TPO-based composition and the second resin-based composition is referred to as a second TPO-based composition. The first and second TPO-based compositions used to respectively form the skin layer 12 and the foam layer 14 each may comprise a base resin, a light stabilizer mixture, and optionally a pigment.

The base resin may comprise an olefin-block copolymer (OBC) and a polypropylene copolymer. The base resin may constitute, by weight, greater than or equal to about 50%, optionally about 55%, or optionally about 60% to less than or equal to about 90%, or optionally about 80%, of the TPO-based composition.

In the first TPO-based composition used to form the skin layer 12, the olefin-block copolymer may constitute, by weight, greater than or equal to about 50% to less than or equal to about 70% of the first TPO-based composition and the polypropylene copolymer may constitute, by weight, greater than or equal to about 10% to less than or equal to about 30% of the first TPO-based composition.

In one aspect, in the second TPO-based composition used to form the foam layer 14, the olefin-block copolymer may constitute, by weight, greater than or equal to about 70% to less than or equal to about 90% of the second TPO-based composition and the polypropylene copolymer may constitute, by weight, greater than or equal to about 5% to less than or equal to about 10% of the second TPO-based composition. In another aspect, in the second TPO-based composition used to form the foam layer 14, the olefin-block copolymer may constitute, by weight, greater than or equal to about 30% to less than or equal to about 50% of the second TPO-based composition and the polypropylene copolymer may constitute, by weight, greater than or equal to about 20% to less than or equal to about 50% of the second TPO-based composition.

In aspects, the olefin-block copolymer of the base resin comprises an ethylene-1-octene copolymer having greater than or equal to about 50 wt. % to less than or equal to about 70 wt. % ethylene based on the total weight of the ethylene-1-octene copolymer. The ethylene-1-octene copolymer has a density of greater than or equal to about 0.887 g/cm$^3$ to less than or equal to about 0.95 g/cm$^3$ and a melt flow rate, as measured according to ASTM D-1238 (at 180° C. and 2.18 kg), of greater than or equal to about 5 g/10 min to less than or equal to about 20 g/10 min.

The polypropylene copolymer of the base resin is highly crystalline with a low impact strength of greater than or equal to about 30 J/m to less than or equal to about 40 J/m, e.g., 35 J/m, and a high melt flow rate, as measured according to ASTM D-1238 (at 230° C. and 2.16 kg), of greater than or equal to about 75 g/10 min to less than or equal to about 125 g/10 min, such as an exemplary melt flow rate of about 100 g/10 min.

The light stabilizer mixture may comprise a sulfur-free stabilizer additive and a hindered amine light stabilizer (HALS). The sulfur-free stabilizer additive may be included in the TPO-based composition to inhibit blooming, reduce volatile organic compound (VOC) emissions, and to improve the thermal stability of the composite part 10. Nonlimiting examples of the sulfur-free stabilizer additives include,2,6,6-tetramethylpiperidin-4-yl-hexadecanoate, 2,2, 6,6-tetramethylpiperidin-4-yl-octadecanoate, and combinations thereof. The sulfur-free stabilizer additive may constitute, by weight, greater than or equal to about 0.1% to less than or equal to about 0.8% of the TPO-based composition. The HALS included in the TPO-based composition may comprise substantially the same materials as described above with respect to the HALS included in the PVC-based composition and may be included in the TPO-based composition for substantially the same reasons. For example, the HALS may comprise a piperidine, an amide, or a combination thereof. In aspects, the HALS may comprise a piperidine. The HALS may constitute, by weight, greater than or equal to about 2% to less than or equal to about 6% of the TPO-based composition.

In addition to the base resin, the light stabilizer mixture, and the optional pigment, the first TPO-based composition used to form the skin layer 12 may comprise an adhesion promoter, a scuff and mar resistance additive, and an inorganic filler.

The adhesion promoter, which may also be referred to as a compatibilizer, may be formulated to help form cohesive bonds within the skin layer 12. The adhesion in the first TPO-based composition used to form the skin layer 12 may constitute, by weight, greater than or equal to about 1% to less than or equal to about 10% of the first TPO-based composition. The adhesion promoter may comprise a maleic-anhydride grafted olefin-block copolymer. The maleic-anhydride grafted olefin-block copolymer of the adhesion promoter may be the same type of olefin-block copolymer as in the base polymer. For example, in the base resin, the olefin-block copolymer may comprise an ethylene-1-octene copolymer and the adhesion promoter may comprise maleic anhydride-grafted ethylene-1-octene copolymer. In some aspects, the adhesion promoter comprises the maleic anhydride-grafted ethylene-1-octene copolymer at a concentration of greater than or equal to about 95 wt. % to less than or equal to about 98 wt. %, maleic anhydride at a concentration of greater than or equal to about 1 wt. % to less than or equal to about 3 wt. %, and N-ethylethylenediamine at a concentration of greater than or equal to about 1 wt. % to less than or equal to about 2 wt. %, wherein the wt. % is based on the total weight of the adhesion promoter.

The scuff and mar resistance additive may be formulated to improve the ability of the first TPO-based composition to resist scuffing, marring, and scratching. Scuff and mar resistance additives include amides, lubricants (including silicon oils), organic-modified siloxanes, thermoplastic elastomers, and grafted polymers, as non-limiting examples. In one configuration, the scuff and mar resistance additive is an alloy of a lubricant and a thermoplastic elastomer. An exemplary and non-limiting scuff and mar resistance additive is NOF®-ALLOY KA832 scratch improver from NOF Corporation. The scuff and mar resistance additive may constitute, by weight, greater than or equal to about 3% to less than or equal to about 7% of the first TPO-based composition.

The inorganic filler included in first TPO-based composition used to form the skin layer 12 may be formulated to control and/or adjust the density of the skin layer 12 and may comprise talc, hydrous magnesium silicate, or a combination thereof. The inorganic filler may constitute, by weight, greater than or equal to about 3% to less than or equal to about 10% of the first TPO-based composition. In aspects, the inorganic filler increases, and thus improves, the bulk density of the first TPO-based composition. In certain aspects, the bulk density of the first TPO-based composition is greater than or equal to about 18 lb/ft$^3$ to less than or equal to about 21 lb/ft$^3$.

In addition to the base resin, the light stabilizer mixture, and the optional pigment, the second TPO-based composition used to form the foam layer 14 may comprise a heat stabilizer, a foaming agent, and an activator.

The heat stabilizer included in the second TPO-based composition used to form the foam layer 14 may comprise one or more of the same materials as descried above with respect to the heat stabilizer included in the PVC-based composition and may be included in the TPO-based composition for substantially the same reasons. The heat stabilizer may constitute, by weight, greater than or equal to about 1% to less than or equal to about 3% of the second TPO-based composition.

The foaming agent included in the second TPO-based composition used to form the foam layer 14 may comprise one or more of the same materials as descried above with respect to the foaming agent included in the PVC-based composition and may be included in the TPO-based composition for substantially the same reasons. The foaming agent may constitute, by weight, greater than or equal to about 0.25% to less than or equal to about 5% of the second TPO-based composition.

The activator included in the second TPO-based composition used to form the foam layer 14 may comprise one or more of the same materials as descried above with respect to the activator included in the PVC-based composition and may be included in the TPO-based composition for substantially the same reasons. The activator may constitute, by weight, greater than or equal to about 0.05% to less than or equal to about 0.5% of the second TPO-based composition.

The optional pigment may comprise one or more of the same materials as descried above with respect to the pigment optionally included in the PVC-based composition and may be included in the TPO-based composition in substantially the same amounts.

Figure 4:
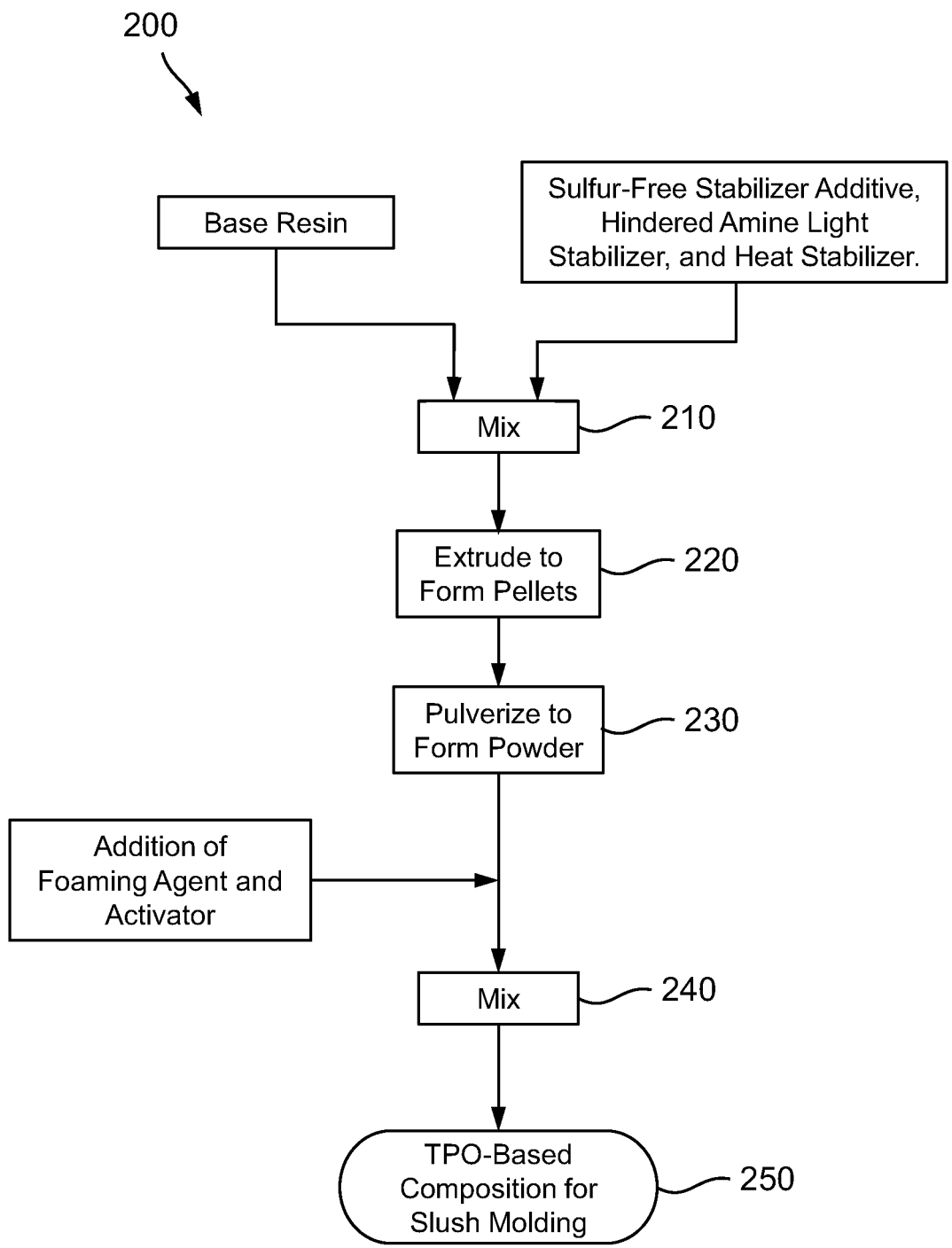
FIG. 4 is a process flow diagram of a method of manufacturing a TPO-based composition for a slush molding process.

Referring now to FIG. 4, the TPO-based composition is manufactured by a method 200 that includes one or more of the following steps. In a first step 210, the base resin, the sulfur-free stabilizer additive, the HALS, and the heat stabilizer are mixed together to form a mixture. In step 220, the mixture is extruded to form pellets. In step 230, the pellets are ground or pulverized to form a powder. The pellets may be ground or pulverized, for example, under water. In step 240, the powder is mixed with the foaming agent and the activator to uniformly distribute the foaming agent and the activator throughout the powder and form the TPO-based composition in step 250.

In embodiments, a method of manufacturing a TPO-based composition for slush molding comprises steps (a)-(e). In step (a), a base resin, a sulfur-free stabilizer additive, a hindered amine light stabilizer (HALS), and a heat stabilizer are mixed to form a mixture. In step (b), the mixture is extruded to form pellets. In step (c), the pellets are ground or pulverized to form a powder. In step (d), a foaming agent and an activator are introduced into the powder. In step (e), the powder, the foaming agent, and the activator are mixed together to uniformly distribute the foaming agent and the activator throughout the powder and form the TPO-based composition.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification are to be understood as being modified in all instances by the term "about" whether or not "about" actually appears before the numerical value. Numerical values of parameters in the appended claims are to be understood as being modified by the term "about" only when such term appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight. When a composition or material is referred to as being "substantially free" of a substance, the composition or material may comprise, by weight, less than 5%, optionally less than 3%, optionally less than 1%, or optionally less than 0.1% of the substance.

What is claimed is:

1. A method of manufacturing a composite part, the method comprising:
    (a) introducing a first resin-based composition into a mold cavity using a slush molding technique, the mold cavity being defined by a mold surface;
    (b) heating the mold cavity to melt the first resin-based composition and form a skin layer on the mold surface;
    (c) introducing a second resin-based composition into the mold cavity using a slush molding technique;
    (d) heating the mold cavity to melt the second resin-based composition and form a foam layer on the mold surface over the skin layer; and
    (e) removing the composite part from the mold cavity, wherein, during formation of the foam layer, chemical bonds form between the skin layer and the foam layer that join the skin layer and the foam layer together, and wherein the first resin-based composition and the second resin-based composition each comprise:
        (1) a polyvinyl chloride (PVC)-based composition and the second resin-based composition comprises about 51 parts per hundred resin to about 80 parts per hundred resin of a plasticizer, or
        (2) a thermoplastic polyolefin (TPO)-based composition.

2. The method of claim 1, wherein the first resin-based composition and the second resin-based composition each comprise the PVC-based composition, the first resin-based composition comprises about 65 parts per hundred resin to about 105 parts per hundred resin of a plasticizer, the plasticizer of the first resin-based composition and of the second resin-based composition comprises a primary plasticizer and a secondary plasticizer, the primary plasticizer comprises an adipate, phthalate, trimellitate, or a combination thereof, the secondary plasticizer comprises an oil-based material, and wherein the PVC-based composition of the first resin-based composition and the second resin-based composition comprises:
    about 100 parts per hundred resin of one or more PVC homopolymers;
    about 1 parts per hundred resin to about 10 parts per hundred resin of a heat stabilizer;
    about 0.1 parts per hundred resin to about 2 parts per hundred resin of a UV absorber;
    about 0.1 parts per hundred resin to about 2 parts per hundred resin of a hindered amine light stabilizer (HALS); and
    about 5 parts per hundred resin to about 15 parts per hundred resin of an absorbent powder.

3. The method of claim 2, wherein the heat stabilizer comprises a zinc-containing compound and a barium-containing compound, the UV absorber comprises a benzotriazole, a benzophenone, benzoate, or a combination thereof, the HALS comprises a piperidine compound, and the absorbent powder comprises porous particles of a PVC homopolymer.

4. The method of claim 2, wherein the PVC-based composition of the first resin-based composition comprises about 60 parts per hundred resin to about 90 parts per hundred resin of the primary plasticizer and about 5 parts per hundred resin to about 15 parts per hundred resin of the secondary plasticizer, and wherein the PVC-based composition of the first resin-based composition further comprises:
    about 0.5 parts per hundred resin to about 2 parts per hundred resin of an inorganic filler.

5. The method of claim 4, wherein the PVC-based composition of the second resin-based composition comprises about 50 parts per hundred resin to about 70 parts per hundred resin of the primary plasticizer and about 1 part per hundred resin to about 10 parts per hundred resin of the secondary plasticizer, and wherein the PVC-based composition of the second resin-based composition further comprises:
    about 1 part per hundred resin to about 22 parts per hundred resin of a foaming agent; and
    about 0.1 parts per hundred resin to about 0.5 parts per hundred resin of an activator.

6. The method of claim 5, wherein the foaming agent comprises an endothermic chemical foaming agent or an exothermic chemical foaming agent, the activator comprises a zinc-containing compound, and wherein, when the foaming agent is combined with the activator, the foaming agent is configured to decompose at temperatures greater than or equal to about 150 degrees Celsius to less than about 180 degrees Celsius to release gases of nitrogen, carbon monoxide, carbon dioxide, or combinations thereof.

7. The method of claim 1, wherein the first resin-based composition and/or the second resin-based composition comprises about 0.5 parts per hundred resin to about 2 parts per hundred resin of a pigment.

8. The method of claim 1, wherein the first resin-based composition and the second resin-based composition each comprise the TPO-based composition, and wherein the TPO-based composition comprises, by weight:
    about 50% to about 90% of a base resin comprising an olefin-block copolymer and a polypropylene copolymer;
    about 0.1% to about 0.8% of a sulfur-free stabilizer additive; and
    about 2% to about 6% of a hindered amine light stabilizer (HALS).

9. The method of claim 8, wherein the TPO-based composition of the first resin-based composition comprises, by weight, about 50% to about 70% of the olefin-block copolymer and about 10% to about 30% of the polypropylene copolymer, and wherein the TPO-based composition of the first resin-based composition further comprises, by weight:
    about 1% to about 10% of a maleic-anhydride grafted olefin-block copolymer;
    about 3% to about 7% of a scuff and mar resistance additive comprising a lubricant and a thermoplastic elastomer; and
    about 3% to about 10% of an inorganic filler.

10. The method of claim 9, wherein the TPO-based composition of the second resin-based composition further comprises, by weight:
    about 1% to about 3% of a heat stabilizer;
    about 0.25% to about 5% of a foaming agent; and
    about 0.05% to about 0.5% of an activator.

11. The method of claim 10, wherein the heat stabilizer comprises a zinc-containing compound and a barium-containing compound, the foaming agent comprises an endothermic chemical foaming agent or an exothermic chemical foaming agent, the activator comprises a zinc-containing compound, and wherein, when the foaming agent is combined with the activator, the foaming agent is configured to decompose at temperatures greater than or equal to about 150 degrees Celsius to less than about 180 degrees Celsius to release gases of nitrogen, carbon monoxide, carbon dioxide, or combinations thereof.

12. The method of claim 10, wherein the TPO-based composition of the second resin-based composition comprises, by weight:
   about 70% to about 90% of the olefin-block copolymer and about 5% to about 10% of the polypropylene copolymer, or
   about 30% to about 50% of the olefin-block copolymer and about 20% to about 50% of the polypropylene copolymer.

13. The method of claim 1, wherein the mold cavity is heated in step (b) to a temperature of greater than or equal to about 235 degrees Celsius to less than or equal to about 240 degrees Celsius, and wherein the mold cavity is heated in step (d) to a temperature of greater than or equal to about 185 degrees Celsius to less than or equal to about 210 degrees Celsius.

14. The method of claim 1, wherein gas is not introduced into the mold cavity from an external source during formation of the foam layer.

15. The method of claim 1, further comprising:
   after step (d), cooling the skin layer and the foam layer in the mold cavity to a temperature less than or equal to about 50 degrees Celsius to form the composite part.

16. The method of claim 1, wherein the foam layer does not comprise polyurethane.

17. A method of manufacturing a composite part, the method comprising:
   (a) slush molding a first resin-based composition in a mold cavity;
   (b) melting the first resin-based composition to form a skin;
   (c) slush molding a second resin-based composition into the mold cavity;
   (d) melting the second resin-based composition to form a foam on the skin; and
   (e) removing the composite part having the skin and the foam from the mold cavity,
   wherein the first resin-based composition and the second resin-based composition each comprise:
      (1) a polyvinyl chloride (PVC)-based composition and the second resin-based composition comprises about 51 parts per hundred resin to about 80 parts per hundred resin of a plasticizer, or
      (2) a thermoplastic polyolefin (TPO)-based composition, and
   wherein, during formation of the foam, chemical bonds form between the skin and the foam that join the skin and the foam together.

18. The method of claim 17, wherein the first resin-based composition and the second resin-based composition each comprise the PVC-based composition, the first resin-based composition comprises about 65 parts per hundred resin to about 105 parts per hundred resin of a plasticizer, the plasticizer of the first resin-based composition and of the second resin-based composition comprises a primary plasticizer and a secondary plasticizer, the primary plasticizer comprises an adipate, phthalate, trimellitate, or a combination thereof, the secondary plasticizer comprises an oil-based material, and wherein the PVC-based composition of the first resin-based composition and the second resin-based composition comprises:
   about 100 parts per hundred resin of one or more PVC homopolymers;
   about 1 parts per hundred resin to about 10 parts per hundred resin of a heat stabilizer;
   about 0.1 parts per hundred resin to about 2 parts per hundred resin of a UV absorber;
   about 0.1 parts per hundred resin to about 2 parts per hundred resin of a hindered amine light stabilizer (HALS); and
   about 5 parts per hundred resin to about 15 parts per hundred resin of an absorbent powder.

19. The method of claim 17, further comprising adding a heat stabilizer comprising a zinc-containing compound and a barium-containing compound, adding a UV absorber comprising a benzotriazole, a benzophenone, benzoate, or a combination thereof, adding a hindered amine light stabilizer comprising a piperidine compound, and adding absorbent powder comprising porous particles of a PVC homopolymer.

20. The method of claim 18, wherein the PVC-based composition of the first resin-based composition comprises about 60 parts per hundred resin to about 90 parts per hundred resin of the primary plasticizer and about 5 parts per hundred resin to about 15 parts per hundred resin of the secondary plasticizer, and wherein the PVC-based composition of the first resin-based composition further comprises:
   about 0.5 parts per hundred resin to about 2 parts per hundred resin of an inorganic filler.

21. The method of claim 18, wherein the PVC-based composition of the second resin-based composition comprises about 50 parts per hundred resin to about 70 parts per hundred resin of the primary plasticizer and about 1 part per hundred resin to about 10 parts per hundred resin of the secondary plasticizer, and wherein the PVC-based composition of the second resin-based composition further comprises:
   about 1 part per hundred resin to about 22 parts per hundred resin of a foaming agent; and
   about 0.1 parts per hundred resin to about 0.5 parts per hundred resin of an activator.

22. The method of claim 17, further comprising adding a foaming agent comprising an endothermic chemical foaming agent or an exothermic chemical foaming agent, adding an activator comprising a zinc-containing compound, and when the foaming agent is combined with the activator, the foaming agent is configured to decompose at temperatures greater than or equal to about 150 degrees Celsius to less than about 180 degrees Celsius to release gases of nitrogen, carbon monoxide, carbon dioxide, or combinations thereof, wherein the foam has a density of greater than or equal to about 0.17 grams per cubic centimeter and less than or equal to about 0.5 grams per cubic centimeter, and wherein the density of the foam is less than that of the skin.

23. The method of claim 17, wherein
   the first resin-based composition and/or the second resin-based composition comprises about 0.5 parts per hundred resin to about 2 parts per hundred resin of a pigment.

24. The method of claim 17, wherein the first resin-based composition and the second resin-based composition each comprise the TPO-based composition, and wherein the TPO-based composition comprises, by weight:
- about 50% to about 90% of a base resin comprising an olefin-block copolymer and a polypropylene copolymer;
- about 0.1% to about 0.8% of a sulfur-free stabilizer additive; and
- about 2% to about 6% of a hindered amine light stabilizer (HALS).

25. The method of claim 24, wherein the TPO-based composition of the first resin-based composition comprises, by weight, about 50% to about 70% of an olefin-block copolymer and about 10% to about 30% of a polypropylene copolymer, and wherein the TPO-based composition of the first resin-based composition further comprises, by weight:
- about 1% to about 10% of a maleic-anhydride grafted olefin-block copolymer;
- about 3% to about 7% of a scuff and mar resistance additive comprising a lubricant and a thermoplastic elastomer; and
- about 3% to about 10% of an inorganic filler.

26. The method of claim 24, wherein the TPO-based composition of the second resin-based composition further comprises:
- about 1% to about 3% of a heat stabilizer;
- about 0.25% to about 5% of a foaming agent; and
- about 0.05% to about 0.5% of an activator.

27. The method of claim 26, wherein the TPO-based composition of the second resin-based composition comprises, by weight:
- about 70% to about 90% of an olefin-block copolymer and about 5% to about 10% of a polypropylene copolymer, or
- about 30% to about 50% of the olefin-block copolymer and about 20% to about 50% of the polypropylene copolymer.

28. The method of claim 17, wherein gas is not introduced into the mold cavity from an external source during formation of the foam and the foam does not comprise polyurethane.

29. The method of claim 17, wherein:
- a bonding strength between the skin and the foam is greater than about 40 Newtons per centimeter as measured by 90° peel testing on a tensile compression testing machine; and
- the composite part is an interior component of an automotive land vehicle with the skin being a pliable Class A surface.

30. A method of manufacturing a composite part, the method comprising:
- (a) slush molding a first resin-based composition in a mold cavity;
- (b) melting the first resin-based composition to form a pliable skin;
- (c) slush molding a second resin-based composition into the mold cavity;
- (d) melting the second resin-based composition to form a foam on the skin;
- (e) adding a foaming agent comprising an endothermic chemical foaming agent or an exothermic chemical foaming agent;
- (f) adding an activator comprising a zinc-containing compound;
- (g) when the foaming agent is combined with the activator, the foaming agent is configured to decompose at temperatures greater than or equal to about 150 degrees Celsius to less than about 180 degrees Celsius to release gases of nitrogen, carbon monoxide, carbon dioxide, or combinations thereof;
- (h) removing the composite part, having the skin and the foam, from the mold cavity, the composite part being a vehicular interior part with a Class A surface;
- (i) the first resin-based composition and the second resin-based composition each comprise:
  - (1) a polyvinyl chloride (PVC)-based composition and the second resin-based composition comprises about 51 parts per hundred resin to about 80 parts per hundred resin of a plasticizer, or
  - (2) a thermoplastic polyolefin (TPO)-based composition;
- (j) forming chemical bonds that join the skin and the foam together; and
- (k) wherein a bonding strength between the skin and the foam is greater than 40 Newtons per centimeter as measured by 90° peel testing on a tensile compression testing machine.

* * * * *